US009935375B2

(12) United States Patent
Bowers et al.

(10) Patent No.: US 9,935,375 B2
(45) Date of Patent: Apr. 3, 2018

(54) SURFACE SCATTERING REFLECTOR ANTENNA

(71) Applicant: Elwha LLC, Bellevue, WA (US)

(72) Inventors: Jeffrey A. Bowers, Bellevue, WA (US); David Jones Brady, Durham, NC (US); Tom Driscoll, San Diego, CA (US); John Desmond Hunt, Knoxville, TN (US); Roderick A. Hyde, Redmond, WA (US); Nathan Ingle Landy, Mercer Island, WA (US); Guy Shlomo Lipworth, Durham, NC (US); Alexander Mrozack, Durham, NC (US); David R. Smith, Durham, NC (US); Clarence T. Tegreene, Mercer Island, WA (US)

(73) Assignee: Elwha LLC

( * ) Notice: Subject to any disclaimer, the term of this patent is extended or adjusted under 35 U.S.C. 154(b) by 744 days.

(21) Appl. No.: 14/102,253

(22) Filed: Dec. 10, 2013

(65) Prior Publication Data

US 2015/0162658 A1 Jun. 11, 2015

(51) Int. Cl.
*G01S 1/00* (2006.01)
*G01S 1/12* (2006.01)
*H01Q 15/00* (2006.01)

(52) U.S. Cl.
CPC .................................. *H01Q 15/006* (2013.01)

(58) Field of Classification Search
CPC ........... G01S 1/24; H01Q 19/10; H01Q 19/19
USPC .......... 342/81, 385, 360, 416; 343/837, 913, 343/915
See application file for complete search history.

(56) References Cited

U.S. PATENT DOCUMENTS

| | | | |
|---|---|---|---|
| 3,001,193 | A | 9/1961 | Marie |
| 3,388,396 | A | 6/1968 | Rope et al. |
| 3,714,608 | A | 1/1973 | Barnes et al. |
| 3,757,332 | A | 9/1973 | Tricoles |
| 3,887,923 | A | 6/1975 | Hendrix |
| 4,195,262 | A | 3/1980 | King |
| 4,291,312 | A | 9/1981 | Kaloi |
| 4,305,153 | A | 12/1981 | King |
| 4,489,325 | A | 12/1984 | Bauck et al. |
| 4,509,209 | A | 4/1985 | Itoh et al. |
| 4,672,378 | A | 6/1987 | Drabowitch et al. |
| 4,701,762 | A | 10/1987 | Apostolos |
| 4,780,724 | A | 10/1988 | Sharma et al. |

(Continued)

FOREIGN PATENT DOCUMENTS

| | | | |
|---|---|---|---|
| JP | 52-13751 | A | 2/1977 |
| JP | 2007-081825 | A | 3/2007 |

(Continued)

OTHER PUBLICATIONS

European Patent Office, Supplementary European Search Report, pursuant to Rule 62 EPC; App. No. EP 11 83 2873; dated May 15, 2014 (received by our Agent on May 21, 2014); 7 pages.

(Continued)

*Primary Examiner* — Dao L Phan

(57) ABSTRACT

A surface scattering reflector antenna includes a plurality of adjustable scattering elements and is configured to produce a reflected beam pattern according to the configuration of the adjustable scattering elements.

50 Claims, 4 Drawing Sheets

(56) References Cited

U.S. PATENT DOCUMENTS 4,832,429 A * 5/1989 Nagler ................. G02B 26/126 359/216.1
4,874,461 A 10/1989 Sato et al.
4,920,350 A 4/1990 McGuire et al.
4,947,176 A 8/1990 Inatsune et al.
4,978,934 A 12/1990 Saad
5,198,827 A 3/1993 Seaton
5,455,590 A 10/1995 Collins et al.
5,512,906 A 4/1996 Speciale
5,734,347 A 3/1998 McEligot
5,841,543 A * 11/1998 Guldi .................. G01N 21/956 250/559.39
5,889,599 A 3/1999 Takemori
6,031,506 A 2/2000 Cooley et al.
6,061,023 A 5/2000 Daniel et al.
6,061,025 A 5/2000 Jackson et al.
6,075,483 A 6/2000 Gross
6,084,540 A 7/2000 Yu
6,114,834 A 9/2000 Parise
6,166,690 A 12/2000 Lin et al.
6,198,453 B1 3/2001 Chew
6,211,823 B1 4/2001 Herring
6,232,931 B1 5/2001 Hart
6,236,375 B1 5/2001 Chandler et al.
6,275,181 B1 8/2001 Kitayoshi
6,366,254 B1 4/2002 Sievenpiper et al.
6,384,797 B1 5/2002 Schaffner et al.
6,396,440 B1 5/2002 Chen
6,469,672 B1 10/2002 Marti-Canales et al.
6,545,645 B1 4/2003 Wu
6,552,696 B1 4/2003 Sievenpiper et al.
6,633,026 B2 10/2003 Tuominen
6,985,107 B2 1/2006 Anson et al.
7,068,234 B2 6/2006 Sievenpiper
7,151,499 B2 12/2006 Avakian et al.
7,154,451 B1 12/2006 Sievenpiper
7,253,780 B2 8/2007 Sievenpiper
7,295,146 B2 11/2007 McMakin et al.
7,307,596 B1 12/2007 West
7,339,521 B2 3/2008 Scheidemann et al.
7,428,230 B2 9/2008 Park
7,456,787 B2 11/2008 Manasson et al.
7,609,223 B2 10/2009 Manasson et al.
7,667,660 B2 2/2010 Manasson et al.
7,830,310 B1 11/2010 Sievenpiper et al.
7,834,795 B1 11/2010 Dudgeon et al.
7,864,112 B2 1/2011 Manasson et al.
7,911,407 B1 3/2011 Fong et al.
7,929,147 B1 4/2011 Fong et al.
7,995,000 B2 8/2011 Manasson et al.
8,009,116 B2 8/2011 Peichl et al.
8,014,050 B2 9/2011 McGrew
8,040,586 B2 10/2011 Smith et al.
8,059,051 B2 11/2011 Manasson et al.
8,134,521 B2 3/2012 Herz et al.
8,179,331 B1 5/2012 Sievenpiper
8,212,739 B2 7/2012 Sievenpiper
8,339,320 B2 12/2012 Sievenpiper
8,456,360 B2 6/2013 Manasson et al.
9,231,303 B2 1/2016 Edelmann et al.
9,268,016 B2 2/2016 Smith et al.
9,389,305 B2 7/2016 Boufounos
9,634,736 B2 4/2017 Mukherjee et al.
2002/0039083 A1 4/2002 Taylor et al.
2002/0167456 A1 11/2002 McKinzie, III
2003/0214443 A1 11/2003 Bauregger et al.
2004/0227668 A1 11/2004 Sievenpiper
2004/0263408 A1 12/2004 Sievenpiper et al.
2005/0031295 A1 2/2005 Engheta et al.
2005/0088338 A1 4/2005 Masenten et al.
2006/0065856 A1 3/2006 Diaz et al.
2006/0114170 A1 6/2006 Sievenpiper
2006/0116097 A1 6/2006 Thompson
2006/0132369 A1 6/2006 Robertson et al.
2006/0187126 A1 8/2006 Sievenpiper
2007/0085757 A1 4/2007 Sievenpiper
2007/0103381 A1 5/2007 Upton
2007/0159395 A1 7/2007 Sievenpiper et al.
2007/0159396 A1 7/2007 Sievenpiper et al.
2007/0182639 A1 8/2007 Sievenpiper et al.
2007/0200781 A1 8/2007 Ahn et al.
2007/0229357 A1 10/2007 Zhang et al.
2008/0020231 A1 * 1/2008 Yamada ............... C08G 59/621 428/626
2008/0165079 A1 7/2008 Smith et al.
2008/0180339 A1 7/2008 Yagi
2008/0224707 A1 9/2008 Wisler et al.
2008/0259826 A1 10/2008 Struhsaker
2008/0268790 A1 10/2008 Shi et al.
2008/0316088 A1 12/2008 Pavlov et al.
2009/0002240 A1 1/2009 Sievenpiper et al.
2009/0045772 A1 2/2009 Cook et al.
2009/0109121 A1 4/2009 Herz et al.
2009/0147653 A1 6/2009 Waldman et al.
2009/0195361 A1 8/2009 Smith
2009/0251385 A1 10/2009 Xu et al.
2010/0066629 A1 3/2010 Sievenpiper
2010/0073261 A1 3/2010 Sievenpiper
2010/0079010 A1 4/2010 Hyde et al.
2010/0109972 A2 5/2010 Xu et al.
2010/0134370 A1 6/2010 Oh et al.
2010/0156573 A1 6/2010 Smith et al.
2010/0157929 A1 6/2010 Karabinis
2010/0188171 A1 7/2010 Mohajer-Iravani et al.
2010/0279751 A1 11/2010 Pourseyed et al.
2010/0328142 A1 12/2010 Zoughi et al.
2011/0098033 A1 4/2011 Britz et al.
2011/0117836 A1 5/2011 Zhang et al.
2011/0128714 A1 6/2011 Terao et al.
2011/0151789 A1 6/2011 Viglione et al.
2011/0267664 A1 11/2011 Kitamura et al.
2012/0026068 A1 2/2012 Sievenpiper
2012/0038317 A1 2/2012 Miyamoto et al.
2012/0112543 A1 5/2012 van Wageningen et al.
2012/0194399 A1 8/2012 Bily et al.
2012/0219249 A1 8/2012 Pitwon
2012/0268340 A1 10/2012 Capozzoli et al.
2012/0274147 A1 11/2012 Stecher et al.
2012/0280770 A1 11/2012 Abhari et al.
2012/0326660 A1 12/2012 Lu et al.
2013/0069865 A1 3/2013 Hart
2013/0082890 A1 4/2013 Wang et al.
2013/0237272 A1 9/2013 Prasad
2013/0249310 A1 9/2013 Hyde et al.
2013/0278211 A1 10/2013 Cook et al.
2013/0288617 A1 10/2013 Kim et al.
2013/0343208 A1 12/2013 Sexton et al.
2014/0128006 A1 5/2014 Hu
2014/0266946 A1 * 9/2014 Bily ....................... H01Q 13/22 343/771
2015/0280444 A1 10/2015 Smith et al.
2017/0098961 A1 4/2017 Harpham

FOREIGN PATENT DOCUMENTS

JP 2008-054146 A 3/2008
JP 2010-187141 A 8/2010
KR 10-1045585 B1 6/2011
WO WO 01/73891 A1 10/2001
WO WO 2008-007545 A1 1/2008
WO WO 2008/059292 A2 5/2008
WO WO 2009/103042 A2 8/2009
WO WO 2010/0021736 2/2010
WO PCT/US2013/212504 5/2013
WO WO 2013/147470 A1 10/2013

OTHER PUBLICATIONS

Chinese State Intellectual Property Office, Notification of Fourth Office Action, App. No. 2011/80055705.8 (Based on PCT Patent Application No. PCT/US2011/001755); dated May 20, 2016

(56) References Cited

OTHER PUBLICATIONS (received by our Agent on May 30, 2016); pp. 1-4 (machine translation only).
Abdalla et al.; "A Planar Electronically Steerable Patch Array Using Tunable PRI/NRI Phase Shifters"; IEEE Transactions on Microwave Theory and Techniques; Mar. 2009; p. 531-541; vol. 57, No. 3; IEEE.
Amineh et al.; "Three-Dimensional Near-Field Microwave Holography for Tissue Imaging"; International Journal of Biomedical Imaging; Bearing a date of Dec. 21, 2011; pp. 1-11; vol. 2012, Article ID 291494; Hindawi Publishing Corporation.
"Array Antenna with Controlled Radiation Pattern Envelope Manufacture Method"; ESA; Jan. 8, 2013; pp. 1-2; http://www.esa.int/Our_Activities/Technology/Array_antenna_with_controlled_radiation_pattern_envelope_manufacture_method.
Belloni, Fabio; "Channel Sounding"; S-72.4210 PG Course in Radio Communications; Bearing a date of Feb. 7, 2006; pp. 1-25.
Chen, Robert; Liquid Crystal Displays, Wiley, New Jersey 2011 (not provided).
Chin J.Y. et al.; "An efficient broadband metamaterial wave retarder"; Optics Express; vol. 17, No. 9; p. 7640-7647; 2009.
Chu R.S. et al.; "Analytical Model of a Multilayered Meaner-Line Polarizer Plate with Normal and Oblique Plane-Wave Incidence"; IEEE Trans. Ant. Prop.; vol. AP-35, No. 6; p. 652-661; Jun. 1987.
Colburn et al.; "Adaptive Artificial Impedance Surface Conformal Antennas"; in Proc. IEEE Antennas and Propagation Society Int. Symp.; 2009; p. 1-4.
Courreges et al.; "Electronically Tunable Ferroelectric Devices for Microwave Applications"; *Microwave and Millimeter Wave Technologies from Photonic Bandgap Devices to Antenna and Applications*; ISBN 978-953-7619-66-4; Mar. 2010; p. 185-204, InTech.
Cristaldi et al., Chapter 3 "Passive LCDs and Their Addressing Techniques" and Chapter 4 "Drivers for Passive-Matrix LCDs"; *Liquid Crystal Display Drivers: Techniques and Circuits*; ISBN 9048122546; Apr. 8, 2009; p. 75-143; Springer.
Crosslink; Summer 2002; pp. 1-56 vol. 3; No. 2; The Aerospace Corporation.
Den Boer, Wilem; Active Matrix Liquid Crystal Displays; Elsevier, Burlington, MA, 2009 (not provided).
Diaz, Rudy; "Fundamentals of EM Waves"; Bearing a date of Apr. 4, 2013; 6 Total Pages; located at: http://www.microwaves101.com/encyclopedia/absorbingradar1.cfm.
Elliott, R.S.; "An Improved Design Procedure for Small Arrays of Shunt Slots"; Antennas and Propagation, IEEE Transaction on; Jan. 1983; p. 297-300; vol. 31, Issue: 1; IEEE.
Elliott, Robert S. and Kurtz, L.A.; "The Design of Small Slot Arrays"; Antennas and Propagation, IEEE Transactions on; Mar. 1978; p. 214-219; vol. AP-26, Issue 2; IEEE.
Evlyukhin, Andrey B. and Bozhevolnyi, Sergey I.; "Holographic evanescent-wave focusing with nanoparticle arrays"; Optics Express; Oct. 27, 2008; p. 17429-17440; vol. 16, No. 22; OSA.
Fan et al.; "Fast-response and scattering-free polymer network liquid crystals for infrared light modulators"; Applied Physics Letters; Feb. 23, 2004; pp. 1233-1235; vol. 84, No. 8; American Institute of Physics.
Fong, Bryan H. et al.; "Scalar and Tensor Holographic Artificial Impedance Surfaces" IEEE Transactions on Antennas and Propagation; Oct. 2010; p. 3212-3221; vol. 58, No. 10; IEEE.
Frenzel, Lou; "What's the Difference Between EM Near Field and Far Field?"; Electronic Design; Bearing a date of Jun. 8, 2012; 7 Total Pages; located at: http://electronicdesign.com/energy/what-s-difference -between-em-near-field-and-far-field.
Grbic et al.; "Metamaterial Surfaces for Near and Far-Field Applications"; 7$^{th}$ European Conference on Antennas and Propagation (EUCAP 2013); Bearing a date of 2013, Created on Mar. 18, 2014; pp. 1-5.
Grbic, Anthony; "Electrical Engineering and Computer Science"; University of Michigan; Created on Mar. 18, 2014, printed on Jan. 27, 2014; pp. 1-2; located at: http://sitemaker.umich.edu/agrbic/projects.
Imani, et al.; "A Concentrically Corrugated Near-Field Plate"; Bearing a date of 2010, Created on Mar. 18, 2014; pp. 1-4; IEEE.
Imani, et al.; "Design of a Planar Near-Field Plate"; Bearing a date of 2012, Created on Mar. 18, 2014; pp. 1-2; IEEE.
Imani, et al.; "Planar Near-Field Plates"; Bearing a date of 2013, Created on Mar. 18, 2014; pp. 1-10; IEEE.
Islam et al.; "A Wireless Channel Sounding System for Rapid Propagation Measurements"; Bearing a date of Nov. 21, 2012; 7 Total Pages.
Kaufman, D.Y. et al.; "High-Dielectric-Constant Ferroelectric Thin Film and Bulk Ceramic Capacitors for Power Electronics"; Proceedings of the Power Systems World/Power Conversion and Intelligent Motion '99 Conference; Nov. 6-12, 1999; p. 1-9; PSW/PCIM; Chicago, IL.
Kim, David Y.; "A Design Procedure for Slot Arrays Fed by Single-Ridge Waveguide"; IEEE Transactions on Antennas and Propagation; Nov. 1988; p. 1531-1536; vol. 36, No. 11; IEEE.
Kirschbaum, H.S. et al.; "A Method of Producing Broad-Band Circular Polarization Employing an Anisotropic Dielectric"; IRE Trans. Micro. Theory. Tech.; vol. 5, No. 3; p. 199-203; 1957.
Kokkinos, Titos et al.; "Periodic FDTD Analysis of Leaky-Wave Structures and Applications to the Analysis of Negative-Refractive-Index Leaky-Wave Antennas"; IEEE Transactions on Microwave Theory and Techniques; 2006; p. 1-12; ; IEEE.
Konishi, Yohei; "Channel Sounding Technique Using MIMO Software Radio Architecture"; 12$^{th}$ MCRG Joint Seminar; Bearing a date of Nov. 18, 2010; 28 Total Pages.
Kuki et al.; "Microwave Variable Delay Line using a Membrane Impregnated with Liquid Crystal"; IEEE MTT-S Digest; 2002; pp. 363-366; IEEE.
Leveau et al.; "Anti-Jam Protection by Antenna"; GPS World; Feb. 1, 2013; pp. 1-11; North Coast Media LLC; http://gpsworld.com/anti-jam-protection-by-antenna/.
Lipworth et al.; "Magnetic Metamaterial Superlens for Increased Range Wireless Power Transfer"; Scientific Reports; Bearing a date of Jan. 10, 2014; pp. 1-6; vol. 4, No. 3642.
Luo et al.; "High-directivity antenna with small antenna aperture"; Applied Physics Letters; 2009; pp. 193506-1-193506-3; vol. 95; American Institute of Physics.
Manasson et al.; "Electronically Reconfigurable Aperture (ERA): A New Approach for Beam-Steering Technology"; Bearing dates of Oct. 12-15, 2010; pp. 673-679; IEEE.
McLean et al.; "Interpreting Antenna Performance Parameters for EMC Applications: Part 2: Radiation Pattern, Gain, and Directivity"; Created on Apr. 1, 2014; pp. 7-17; TDK RF Solutions Inc.
Mitri, F.G.; "Quasi-Gaussian Electromagnetic Beams"; Physical Review A.; Bearing a date of Mar. 11, 2013; p. 1; vol. 87, No. 035804; (Abstract Only).
PCT International Search Report; International App. No. PCT/US2011/001755; dated Mar. 22, 2012; pp. 1-5.
Poplavlo, Yuriy et al.; "Tunable Dielectric Microwave Devices with Electromechanical Control"; *Passive Microwave Components and Antennas*; ISBN 978-953-307-083-4; Apr. 2010; p. 367-382; InTech.
Rengarajan, Sembiam R. et al.; "Design, Analysis, and Development of a Large Ka-Band Slot Array for Digital Beam-Forming Application"; IEEE Transactions on Antennas and Propagation; Oct. 2009; p. 3103-3109; vol. 57, No. 10; IEEE.
Sakakibara, Kunio; "High-Gain Millimeter-Wave Planar Array Antennas with Traveling-Wave Excitation"; Radar Technology; Bearing a date of Dec. 2009; pp. 319-340.
Sandell et al.; "Joint Data Detection and Channel Sounding for TDD Systems with Antenna Selection"; Bearing a date of 2011, Created on Mar. 18, 2014; pp. 1-5; IEEE.
Sato, Kazuo et al.; "Electronically Scanned Left-Handed Leaky Wave Antenna for Millimeter-Wave Automotive Applications"; Antenna Technology Small Antennas and Novel Metamaterials; 2006; p. 420-423; IEEE.
Siciliano et al.; "25. Multisensor Data Fusion"; Springer Handbook of Robotics; Bearing a date of 2008, Created on Mar. 18, 2014; 27 Total Pages; Springer.

(56) References Cited

OTHER PUBLICATIONS

Sievenpiper, Dan et al.; "Holographic Artificial Impedance Surfaces for Conformal Antennas"; Antennas and Propagation Society International Symposium; 2005; p. 256-259; vol. 1B; IEEE, Washington D.C.
Sievenpiper, Daniel F. et al.; "Two-Dimensional Beam Steering Using an Electrically Tunable Impedance Surface"; IEEE Transactions on Antennas and Propagation; Oct. 2003; p. 2713-2722; vol. 51, No. 10; IEEE.
Smith, David R.; "Recent Progress in Metamaterial and Transformation Optical Design"; NAVAIR Nano/Meta Workshop; Feb. 2-3, 2011; pp. 1-32.
Soper,Taylor; "This startup figured out how to charge devices wirelessly through walls from 40 feet away"; GeekWire; bearing a date of Apr. 22, 2014 and printed on Apr. 24, 2014; pp. 1-12; located at http://www.geekwire.com/2014/ossia-wireless-charging/#disqus_thread.
"Spectrum Analyzer"; Printed on Aug. 12, 2013; pp. 1-2; http://www.gpssource.com/faqs/15; GPS Source.
Sun et al.; "Maximum Signal-to-Noise Ratio GPS Anti-Jam Receiver with Subspace Tracking"; ICASSP; 2005; pp. IV-1085-IV-1088; IEEE.
Thoma et al.; "MIMO Vector Channel Sounder Measurement for Smart Antenna System Evaluation"; Created on Mar. 18, 2014; pp. 1-12.
Umenei, A.E.; "Understanding Low Frequency Non-Radiative Power Transfer"; Bearing a date of Jun. 2011; 7 Total Pages; Fulton Innovation, LLC.
Utsumi, Yozo et al.; "Increasing the Speed of Microstrip-Line-Type Polymer-Dispersed Liquid-Crystal Loaded Variable Phase Shifter"; IEEE Transactions on Microwave Theory and Techniques; Nov. 2005, p. 3345-3353; vol. 53, No. 11; IEEE.
Wallace, John; "Flat 'Metasurface' Becomes Aberration-Free Lens"; Bearing a date of Aug. 28, 2012; 4 Total Pages; located at: http://www.laserfocusworld.com/articles/2012/08/flat-meatsurface-becomes-aberration-free-lens.html.
"Wavenumber"; Microwave Encyclopedia; Bearing a date of Jan. 12, 2008; pp. 1-2; P-N Designs, Inc.
Weil, Carsten et al.; "Tunable Inverted-Microstrip Phase Shifter Device Using Nematic Liquid Crystals"; IEEE MTT-S Digest; 2002; p. 367-370; IEEE.
Yan, Dunbao et al.; "A Novel Polarization Convert Surface Based on Artificial Magnetic Conductor"; Asia-Pacific Microwave Conference Proceedings, 2005.
Yee, Hung Y.; "Impedance of a Narrow Longitudinal Shunt Slot in a Slotted Waveguide Array"; IEEE Transactions on Antennas and Propagation; Jul. 1974; p. 589-592; IEEE.
Yoon et al.; "Realizing Efficient Wireless Power Transfer in the Near-Field Region Using Electrically Small Antennas"; Wireless Power Transfer; Principles and Engineering Explorations; Bearing a date of Jan. 25, 2012; pp. 151-172.
Young et al.; "Meander-Line Polarizer"; IEEE Trans. Ant. Prop.; p. 376-378; May 1973.
Zhong, S.S. et al.; "Compact ridge waveguide slot antenna array fed by convex waveguide divider"; Electronics Letters; Oct. 13, 2005; p. 1-2; vol. 41, No. 21; IEEE.
PCT International Search Report; International App. No. PCT/US2014/070650; dated Mar. 27, 2015; pp. 1-3.
The State Intellectual Property Office of P.R.C.; Application No. 201180055705.8; May 6, 2015; (received by our Agent on May 11, 2015); pp. 1-11.
Intellectual Property Office of Singapore Examination Report; Application No. 2013027842; dated Feb. 27, 2015; (received by our Agent on Apr. 28, 2015); pp. 1-12.
Ovi et al.; "Symmetrical Slot Loading in Elliptical Microstrip Patch Antennas Partially Filled with Mue Negative Metamaterials"; PIERS Proceedings, Moscow, Russia; Aug. 19-23, 2012; pp. 542-545.
PCT International Search Report; International App. No. PCT/US2014/017454; dated Aug. 28, 2014; pp. 1-4.
PCT International Search Report; International App. No. PCT/US2016/037667; dated Sep. 7, 2016; pp. 1-3.
PCT International Search Report; International App. No. PCT/US2015/028781; dated Jul. 27, 2015; pp. 1-3.
PCT International Search Report; International App. No. PCT/US2014/061485; dated Jul. 27, 2015; pp. 1-3.
The State Intellectual Property Office of P.R.C.; Application No. 201180055705.8; Nov. 4, 2015 (received by our Agent on Nov. 10, 2015; pp. 1-11.
PCT International Search Report; International App. No. PCT/US2014/069254; dated Nov. 27, 2015; pp. 1-4.
PCT International Search Report; International App. No. PCT/US2015/036638; dated Oct. 19, 2015; pp. 1-4.
Patent Office of the Russian Federation (Rospatent) Office Action; Application No. 2013119332/28(028599); dated Oct. 13, 2015 (received by our agent on Oct. 23, 2015); machine translation; pp. 1-5.
Fan, Guo-Xin et al.; "Scattering from a Cylindrically Conformal Slotted Waveguide Array Antenna"; IEEE Transactions on Antennas and Propagation; Jul. 1997; pp. 1150-1159; vol. 45, No. 7; IEEE.
Jiao, Yong-Chang et al.; A New Low-Side-Lobe Pattern Synthesis Technique for Conformal Arrays; IEEE Transactions on Antennas and Propagation; Jun. 1993; pp. 824-831, vol. 41, No. 6; IEEE.
PCT International Search Report; International App. No. PCT/US2014/070645; dated Mar. 16, 2015; pp. 1-3.
Definition from Merriam-Webster Online Dictionary; "Integral"; Merriam-Webster Dictionary; pp. 1-5; located at: http://www.merriam-webster.com/dictionary/integral.
Varlamos et al.; "Electronic Beam Steering Using Switched Parasitic Smart Antenna Arrays"; Progress in Electromagnetics Research; PIER 36; bearing a date of 2002; pp. 101-119.
U.S. Appl. No. 13/838,934, Bily et al.
Hand, Thomas H. et al.; "Characterization of complementary electric field coupled resonant surfaces"; Applied Physics Letters; published on Nov. 26, 2008; pp. 212504-1-212504-3; vol. 93; Issue 21; American Institute of Physics.
"Aperture", Definition of Aperture by Merriam-Webster; located at http://www.merriam-webster.com/dictionary/aperture; pp. 1-9; Merriam-Webster, Incorporated.
PCT International Preliminary Report on Patentability; International App. No. PCT/US2014/070645; dated Jun. 21, 2016; pp. 1-12.
Canadian Intellectual Property Office, Canadian Examination Search Report, Pursuant to Subsection 30(2); App. No. 2,814,635; dated Dec. 1, 2016 (received by our Agent on Dec. 6, 2016); pp. 1-3.
Extended European Search Report; European App. No. EP 14 77 0686; dated Oct. 14, 2016 (received by our Agent on Oct. 12, 2016); pp. 1-7.
European Search Report; European App. No. EP 11 832 873.1; dated Sep. 21, 2016; pp. 1-6.
The State Intellectual Property Office of P.R.C., Fifth Office Action, App. No. 2011/80055705.8 (Based on PCT Patent Application No. PCT/US2011/001755); dated Nov. 16, 2016 (received by our Agent on Nov. 23, 2016); pp. 1-3 (machine translation, as provided).
Ayob et al.; "A Survey of Surface Mount Device Placement Machine Optimisation: Machine Classification"; Computer Science Technical Report No. NOTTCS-TR-2005-8; Sep. 2005; pp. 1-34.
Supplementary European Search Report, Pursuant to Rule 62 EPC; App. No. EP 14 87 2595; dated Jul. 3, 2017 (received by our Agent on Jul. 7, 2017); pp. 1-16.
Supplementary European Search Report, Pursuant to Rule 62 EPC; App. No. EP 14 87 2874; dated Jul. 3, 2017 (received by our Agent on Jul. 7, 2017); pp. 1-15.
European Patent Office, Supplementary European Search Report, Pursuant to Rule 62 EPC; App. No. EP 14891152; dated Jul. 20, 2017 (received by our Agent on Jul. 26, 2017); pp. 1-4.

* cited by examiner

SURFACE SCATTERING REFLECTOR ANTENNA

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one embodiment, an apparatus comprises: a substrate, and a plurality of scattering elements each having an adjustable individual electromagnetic response to an incident electromagnetic wave in an operating frequency range, the plurality of scattering elements being arranged in a pattern on the substrate, the pattern having an inter-element spacing selected according to the operating frequency range. In this embodiment the substrate and the plurality of scattering elements form a reflective structure that is responsive to reflect a portion of the incident electromagnetic wave to produce an adjustable radiation field responsive to the adjustable individual electromagnetic responses.

In another embodiment a method comprises: propagating a first wave in free space to a first region, producing a plurality of electromagnetic oscillations in the first region responsive to the first wave, the plurality of electromagnetic oscillations producing a radiated wave having a beam pattern, the first region having an electromagnetic response that at least partially determines the beam pattern, and varying the electromagnetic response in the first region to vary the beam pattern.

In another embodiment a system comprises: a surface scattering reflector antenna having a configuration that is dynamically adjustable, the surface scattering reflector antenna being responsive to electromagnetic energy in a first frequency range to produce a reflected beam pattern according to the configuration; a source configured to produce an electromagnetic wave in a second frequency range, the second frequency range overlapping at least partially with the first frequency range; and control circuitry operably connected to the surface scattering reflector antenna and the source to vary the reflected beam pattern.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
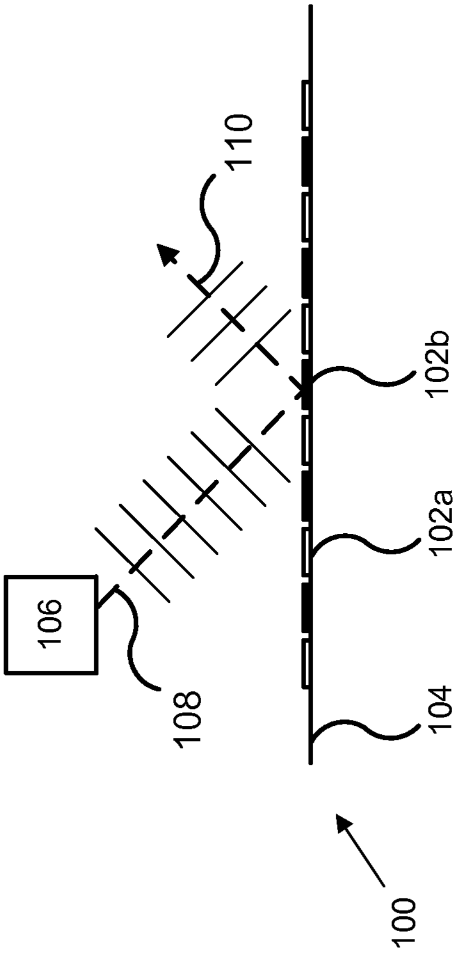
FIG. 1 is a schematic of a surface scattering reflector antenna.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A schematic illustration of a surface scattering reflector antenna 100 is depicted in FIG. 1. The surface scattering reflector antenna 100 includes a plurality of scattering elements 102*a*, 102*b* that are distributed along a substrate 104. The substrate 104 may be a printed circuit board (such as FR4 or another dielectric with a surface layer of metal such as copper or another conductor), or a different type of structure, which may be a single layer or a multi-layer structure. The broken line 108 is a symbolic depiction of an electromagnetic wave incident on the surface scattering reflector antenna 100, and this symbolic depiction is not intended to indicate a collimated beam or any other limitation of the electromagnetic wave. The scattering elements 102*a*, 102*b* may include metamaterial elements and/or other sub-wavelength elements that are embedded within or positioned on a surface of the substrate 104.

The surface scattering reflector antenna 100 may also include a component 106 configured to produce the incident electromagnetic wave 108. The component 106 may be an antenna such as a dipole and/or monopole antenna.

When illuminated with the component 106, the surface scattering reflector antenna 100 produces beam patterns dependent on the pattern formed by the scattering elements 102*a*, 102*b* and the frequency and/or wave vector of the radiation. The scattering elements 102*a*, 102*b* each have an adjustable individual electromagnetic response that is dynamically adjustable such that the reflected beam pattern is adjustable responsive to changes in the electromagnetic response of the elements 102*a*, 102*b*. In some embodiments the scattering elements 102*a*, 102*b* include metamaterial elements that are analogous to the adjustable complementary metamaterial elements described in Bily et al., "Surface Scattering Antennas", U.S. Patent Application number 2012/0194399, which is incorporated herein by reference.

The scattering elements 102*a*, 102*b* are adjustable scattering elements having electromagnetic properties that are adjustable in response to one or more external inputs. Various embodiments of adjustable scattering elements are described, for example, in D. R. Smith et al., "Metamaterials for surfaces and waveguides", U.S. Patent Application Publication No. 2010/0156573, which is incorporated herein by reference, and in Bily et al., previously cited, and further in this disclosure. Adjustable scattering elements can include elements that are adjustable in response to voltage inputs (e.g. bias voltages for active elements (such as varactors, transistors, diodes) or for elements that incorporate tunable dielectric materials (such as ferroelectrics)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), etc. In the schematic example of FIG. 1, scattering elements 102*a*, 102*b* that have been adjusted to a first state having first electromagnetic properties are depicted as the first elements 102*a*, while scattering elements that have been adjusted to a second state having second electromagnetic properties are depicted as the second elements 102*b*. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties. Moreover, the particular pattern of adjustment that is depicted in FIG. 1 (i.e. the alternating arrangement of elements 102*a* and 102*b*) is only an exemplary configuration and is not intended to be limiting.

In the example of FIG. 1, the scattering elements 102*a*, 102*b* have first and second couplings to the incident electromagnetic wave 108 that are functions of the first and second properties, respectively. For example, the first and second couplings may be first and second polarizabilities of the scattering elements at the frequency or frequency band of the incoming wave 108. In one approach the first coupling is a substantially non-zero coupling whereas the second coupling is a substantially zero coupling. In another approach both couplings are substantially non-zero but the first coupling is substantially greater than (or less than) the second coupling. On account of the first and second couplings, the first and second scattering elements 102*a*, 102*b* are responsive to the incoming electromagnetic wave 108 to produce a plurality of scattered electromagnetic waves having amplitudes that are functions of (e.g. are proportional to) the respective first and second couplings. A superposition of the scattered electromagnetic waves, along with the portion of the incoming electromagnetic wave 108 that is reflected by the substrate 104, comprises an electromagnetic wave that is depicted, in this example, as a plane wave 110 that radiates from the surface scattering reflector antenna 100.

The emergence of the plane wave 110 may be understood by regarding the particular pattern of adjustment of the scattering elements (e.g. an alternating arrangement of the first and second scattering elements in FIG. 1) as a pattern that scatters the incoming electromagnetic wave 108 to produce the plane wave 110. Because this pattern is adjustable, some embodiments of the surface scattering elements may be selected according to principles of holography. Suppose, for example, that the incoming wave 108 may be represented by a complex scalar input wave $\Psi_{in}$, and it is desired that the surface scattering reflector antenna produce an output wave that may be represented by another complex scalar wave $\Psi_{out}$. Then a pattern of adjustment of the scattering elements may be selected that corresponds to an interference pattern of the input and output waves along the antenna. For example, the scattering elements may be adjusted to provide couplings to the guided wave or surface wave that are functions of (e.g. are proportional to, or step-functions of) an interference term given by $\mathrm{Re}[\Psi_{out}\Psi_{in}]$. In this way, embodiments of the surface scattering reflector antenna 100 may be adjusted to provide arbitrary antenna radiation patterns by identifying an output wave $\Psi_{out}$ corresponding to a selected beam pattern, and then adjusting the scattering elements accordingly as above. Embodiments of the surface scattering antenna may therefore be adjusted to provide, for example, a selected beam direction (e.g. beam steering), a selected beam width or shape (e.g. a fan or pencil beam having a broad or narrow beamwidth), a selected arrangement of nulls (e.g. null steering), a selected arrangement of multiple beams, a selected polarization state (e.g. linear, circular, or elliptical polarization), a selected overall phase or distribution of phases, or any combination thereof. Alternatively or additionally, embodiments of the surface scattering reflector antenna 100 may be adjusted to provide a selected near-field radiation profile, e.g. to provide near-field focusing and/or near-field nulls.

Because the spatial resolution of the interference pattern is limited by the spatial resolution of the scattering elements, the scattering elements may be arranged along the substrate 104 with inter-element spacings that are much less than a free-space wavelength corresponding to an operating frequency of the device (for example, less than one-third or one-fourth of this free-space wavelength). In some approaches, the operating frequency is a microwave frequency, selected from frequency bands such as Ka, Ku, and Q, corresponding to centimeter-scale free-space wavelengths. This length scale admits the fabrication of scattering elements using conventional printed circuit board technologies, as described below.

In some approaches, the surface scattering reflector antenna 100 includes a substantially one-dimensional arrangement of scattering elements, and the pattern of adjustment of this one-dimensional arrangement may provide, for example, a selected antenna radiation profile as a function of zenith angle (i.e. relative to a zenith direction that is parallel to the one-dimensional wave-propagating structure). In other approaches, the surface scattering reflector antenna includes a substantially two-dimensional arrangement of scattering elements, and the pattern of adjustment of this two-dimensional arrangement may provide, for example, a selected antenna radiation profile as a function of both zenith and azimuth angles (i.e. relative to a zenith direction that is perpendicular to the substrate 104).

In some approaches, the substrate 104 is a modular substrate 104 and a plurality of modular substrates may be assembled to compose a modular surface scattering antenna. For example, a plurality of substrates 104 may be assembled to produce a larger aperture having a larger number of scattering elements; and/or the plurality of substrates may be assembled as a three-dimensional structure (e.g. forming an A-frame structure, a pyramidal structure, a wine crate structure, or other multi-faceted structure).

In some applications of the modular approach, the number of modules to be assembled may be selected to achieve an aperture size providing a desired telecommunications data capacity and/or quality of service, and or a three-dimensional arrangement of the modules may be selected to reduce potential scan loss. Thus, for example, the modular assembly could comprise several modules mounted at various locations/orientations flush to the surface of a vehicle such as an aircraft, spacecraft, watercraft, ground vehicle, etc. The modules need not be contiguous. In these and other approaches, the substrate may have a substantially non-linear or substantially non-planar shape whereby to conform to a particular geometry, therefore providing a conformal surface scattering reflector antenna (conforming, for example, to the curved surface of a vehicle).

More generally, a surface scattering reflector antenna is a reconfigurable antenna that may be reconfigured by selecting a pattern of adjustment of the scattering elements so that a corresponding scattering of the incident electromagnetic wave 108 produces a desired output wave. Thus, embodiments of the surface scattering reflector antenna may provide a reconfigurable antenna that is adjustable to produce a desired output wave by adjusting a plurality of couplings.

In some approaches, the reconfigurable antenna is adjustable to provide a desired polarization state of the output wave. Suppose, for example that first and second subsets of the scattering elements provide electric field patterns that are substantially linearly polarized and substantially orthogonal (for example, the first and second subjects may be scattering elements that are perpendicularly oriented on a surface of the substrate 104). Then the antenna output wave EOM may be expressed as a sum of two linearly polarized components.

Accordingly, the polarization of the output wave may be controlled by adjusting the plurality of couplings, e.g. to provide an output wave with any desired polarization (e.g. linear, circular, or elliptical).

Figure 2:
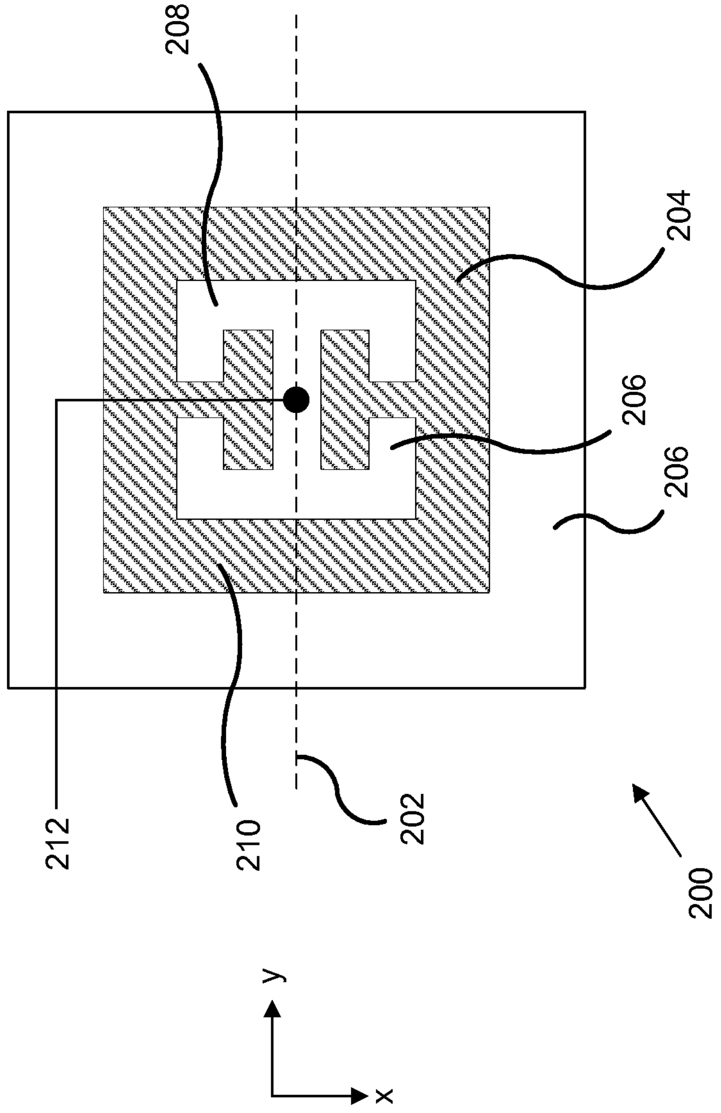
FIG. 2 is a schematic of a cross-section of a unit cell of a surface scattering reflector antenna.
Figure 3:
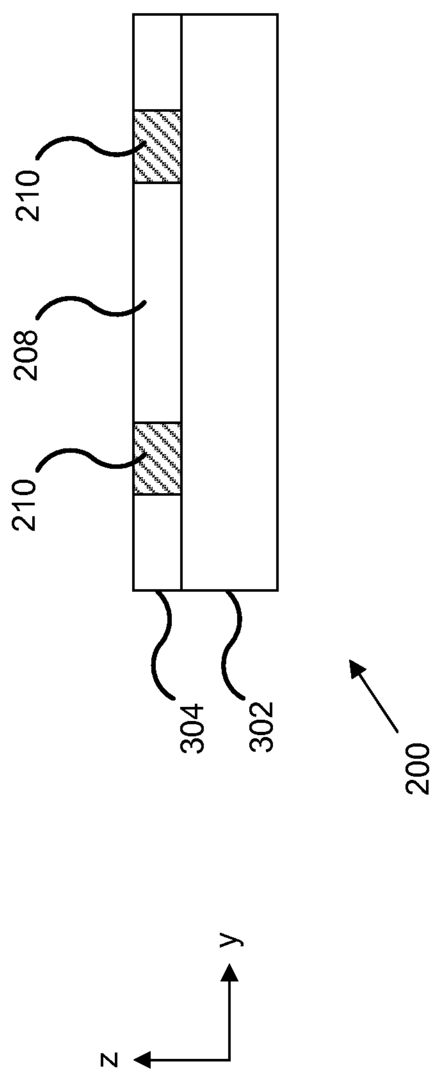
FIG. 3 is a schematic of a side view of a unit cell of a surface scattering reflector antenna.

FIGS. 2 and 3 show a top (FIG. 2) and cross sectional view (FIG. 3; cross section corresponds to dashed line 202 in FIG. 2) of one exemplary embodiment of a unit cell 200 of a scattering element (such as 102*a* and/or 102*b*) of the surface scattering reflector antenna 100. In this embodiment the substrate 104 includes a dielectric layer 302 and a conductor layer 304, where the scattering element (102*a*, 102*b*) is formed by removing a portion of the conductor layer to form a complementary metamaterial element 204, in this case a complementary electric LC (CELC) metamaterial element that is defined by a shaped aperture 206 that has been etched or patterned in the conductor layer 304 (e.g. by a PCB process).

A CELC element such as that depicted in FIGS. 2 and 3 is substantially responsive to a magnetic field that is applied parallel to the plane of the CELC element and perpendicular to the CELC gap complement, i.e., in the x direction for the orientation of FIG. 2 (cf.T.H. Hand et al., "Characterization of complementary electric field coupled resonant surfaces," Applied Physics Letters, 93, 212504 (2008), herein incorporated by reference). Therefore, a magnetic field component of an incident electromagnetic wave can induce a magnetic excitation of the element 204 that may be substantially characterized as a magnetic dipole excitation oriented in the x direction, thus producing a scattered electromagnetic wave that is substantially a magnetic dipole radiation field.

Noting that the shaped aperture 206 also defines a conductor island 208 which is electrically disconnected from outer regions of the conductor layer 304, in some approaches the scattering element can be made adjustable by providing an adjustable material within and/or proximate to the shaped aperture 206 and subsequently applying a bias voltage between the conductor island 208 and the outer regions of the conductor layer 304. For example, as shown in FIG. 2, the unit cell may include liquid crystal 210 in the region between the conductor island 208 and the outer regions of the conductor layer 304. Liquid crystals have a permittivity that is a function of orientation of the molecules comprising the liquid crystal; and that orientation may be controlled by applying a bias voltage (equivalently, a bias electric field) across the liquid crystal; accordingly, liquid crystals can provide a voltage-tunable permittivity for adjustment of the electromagnetic properties of the scattering element. Methods and apparatus for containing the liquid crystal are described in Bily et al.

For a nematic phase liquid crystal, wherein the molecular orientation may be characterized by a director field, the material may provide a larger permittivity $\epsilon_1$ for an electric field component that is parallel to the director and a smaller permittivity $\epsilon_2$ for an electric field component that is perpendicular to the director. Applying a bias voltage introduces bias electric field lines that span the shaped aperture and the director tends to align parallel to these electric field lines (with the degree of alignment increasing with bias voltage). Because these bias electric field lines are substantially parallel to the electric field lines that are produced during a scattering excitation of the scattering element, the permittivity that is seen by the biased scattering element correspondingly tend towards $\epsilon_1$ (i.e. with increasing bias voltage). On the other hand, the permittivity that is seen by the unbiased scattering element may depend on the unbiased configuration of the liquid crystal. When the unbiased liquid crystal is maximally disordered (i.e. with randomly oriented micro-domains), the unbiased scattering element may see an averaged permittivity $\epsilon_{ave}$~$(\epsilon_1+\epsilon_2)/2$. When the unbiased liquid crystal is maximally aligned perpendicular to the bias electric field lines (i.e. prior to the application of the bias electric field), the unbiased scattering element may see a permittivity as small as $\epsilon_2$. Accordingly, for embodiments where it is desired to achieve a greater range of tuning of the permittivity that is seen by the scattering element, the unit cell 200 may include positionally-dependent alignment layer (s) disposed at the top and/or bottom surface of the liquid crystal layer 210, the positionally-dependent alignment layer (s) being configured to align the liquid crystal director in a direction substantially perpendicular to the bias electric field lines that correspond to an applied bias voltage. The alignment layer(s) may include, for example, polyimide layer(s) that are rubbed or otherwise patterned (e.g. by machining or photolithography) to introduce microscopic grooves that run parallel to the channels of the shaped aperture 206.

Alternatively or additionally, the unit cell may provide a first biasing that aligns the liquid crystal substantially perpendicular to the channels of the shaped aperture 206 (e.g. by introducing a bias voltage between the conductor island 208 and the outer regions of the conductor layer 304), and a second biasing that aligns the liquid crystal substantially parallel to the channels of the shaped aperture 206 (e.g. by introducing electrodes positioned above the outer regions of the conductor layer 304 at the four corners of the unit cell, and applying opposite voltages to the electrodes at adjacent corners); tuning of the scattering element may then be accomplished by, for example, alternating between the first biasing and the second biasing, or adjusting the relative strengths of the first and second biasings. Examples of types of liquid crystals that may be used are described in Bily et al.

Turning now to approaches for providing a bias voltage between the conductor island 208 and the outer regions of the conductor layer 304, it is first noted that the outer regions of the conductor layer 304 extends contiguously from one unit cell to the next, so an electrical connection to the outer regions of the conductor layer 304 of every unit cell may be made by a single connection to this contiguous conductor. As for the conductor island 208, FIG. 2 shows an example of how a bias voltage line 212 may be attached to the conductor island. In this example, the bias voltage line 212 is attached at the center of the conductor island and extends away from the conductor island along a plane of symmetry of the scattering element; by virtue of this positioning along a plane of symmetry, electric field lines that are experienced by the bias voltage line during a scattering excitation of the scattering element are substantially perpendicular to the bias voltage line that could disrupt or alter the scattering properties of the scattering element. The bias voltage line 212 may be installed in the unit cell by, for example, depositing an insulating layer (e.g. polyamide), etching the insulating layer at the center of the conductor island 212, and then using a lift-off process to pattern a conducting film (e.g. a Cr/Au bilayer) that defines the bias voltage line 212.

The cross sectional shape of the complementary metamaterial element 204 shown in FIG. 2 is just one exemplary embodiment, and other shapes, orientations, and/or other characteristics may be selected according to a particular embodiment. For example, Bily et al. describes a number of CELC's that may be incorporated in the device as described above, as well as ways in which arrays of CELC's may be addressed.

Figure 4:
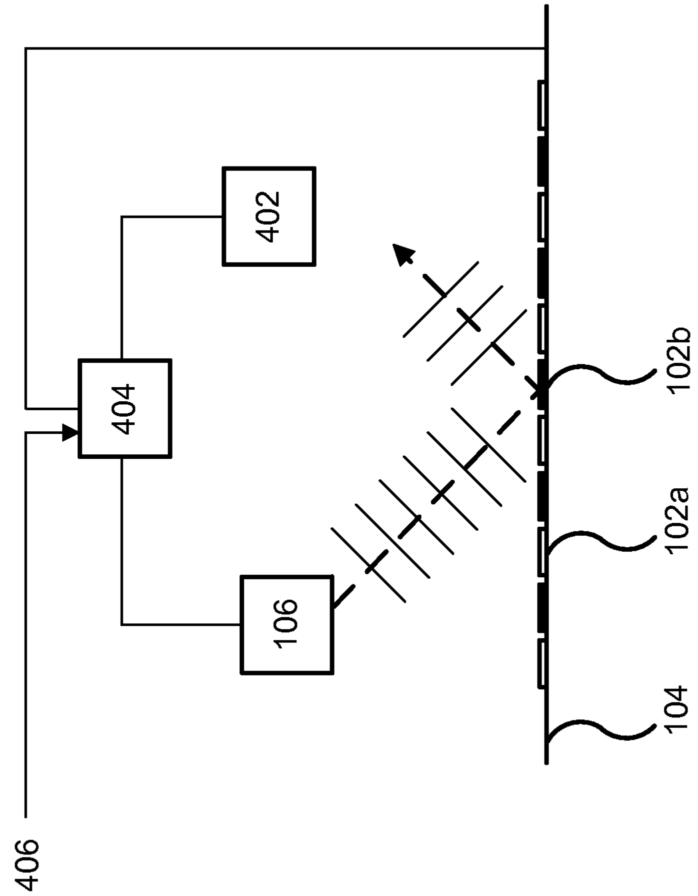
FIG. 4 is a schematic of a system including a surface scattering reflector antenna.

FIG. 4 shows a system incorporating the surface scattering reflector antenna of FIG. 1 with a separate detector 402 and control circuitry 404. In this embodiment the detector 402 and the component 106 that produces the incident wave are housed in separate units, however as mentioned previously in some embodiments they may be housed together in the same unit. The control circuitry 404 is operably connected to both the detector 402 and the component 106, and may transmit and/or receive signal(s) to/from these units. Although the detector 402 and the component 106 are shown as exemplary embodiments of elements that are operably connected to the control circuitry 404, in other embodiments the system may include other devices (for example, power supplies, additional detectors configured to detect the radiation pattern produced by the antenna, detectors configured to monitor conditions of the antenna, or a different device that may be added according to a particular embodiment) that may also be operably connected to the control circuitry 404. In some embodiments the control circuitry 404 is receptive to a signal 406, where the signal 406 may be a user input or other outside input. The control circuitry 404 may also be operably connected to control the surface scattering reflector antenna 100 to adjust the configuration of the antenna in ways as previously described herein.

In some approaches the control circuitry 404 includes circuitry configured to provide control inputs that correspond to a selected or desired radiation pattern. For example, the control circuitry 404 may store a set of configurations of the antenna, e.g. as a lookup table that maps a set of desired antenna radiation patterns (corresponding to various beam directions, beam widths, polarization states, etc. as described previously herein) to a corresponding set of values for the control input(s). This lookup table may be previously computed, e.g. by performing full-wave simulations of the antenna for a range of values of the control input(s) or by placing the antenna in a test environment and measuring the antenna radiation patterns corresponding to a range of values of the control input(s). In some approaches control circuitry may be configured to use this lookup table to calculate the control input(s) according to a regression analysis; for example, by interpolating values for the control input(s) between two antenna radiation patterns that are stored in the lookup table (e.g. to allow continuous beam steering when the lookup table only includes discrete increments of a beam steering angle). The control circuitry 404 may alternatively be configured to dynamically calculate the control input(s) corresponding to a selected or desired antenna radiation pattern, e.g. by, for example, computing a holographic pattern (as previously described herein). Further, the control circuitry 404 may be configured with one or more feedback loops configured to adjust parameters until a selected radiation pattern is achieved.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:

a substrate; and a plurality of scattering elements each having an adjustable individual electromagnetic response to an incident electromagnetic wave in an operating frequency range, the plurality of scattering elements being arranged in a pattern on the substrate, the pattern having an inter-element spacing selected according to the operating frequency range;

wherein the substrate and the plurality of scattering elements form a reflective structure that is responsive to reflect a portion of the incident electromagnetic wave to produce an adjustable radiation field responsive to the adjustable individual electromagnetic responses; and wherein the operating frequency range has a center frequency and a free-space wavelength corresponding to the center frequency, and wherein the inter-element spacing is less than one-third of the free space wavelength.

2. The apparatus of claim 1 wherein the plurality of scattering elements is a plurality of substantially identical scattering elements.

3. The apparatus of claim 1 wherein the inter-element spacing is less than one-fourth of the free space wavelength.

4. The apparatus of claim 1 wherein the substrate has a first reflectivity in the operating frequency range and the plurality of scattering elements have a second reflectivity in the operating frequency range, and wherein the first reflectivity is different from the second reflectivity.

5. The apparatus of claim 1 wherein the scattering elements form a one-dimensional array on the substrate structure.

6. The apparatus of claim 1 further comprising a source configured to provide the incident electromagnetic wave.

7. The apparatus of claim 1 further comprising:

control circuitry coupled to the plurality of scattering elements and configured to provide a set of adjustments of the adjustable individual electromagnetic responses.

8. The apparatus of claim 1 wherein each of the scattering elements includes an electrically adjustable material configured to provide the adjustable individual electromagnetic responses.

9. The apparatus of claim 1 wherein the adjustable individual electromagnetic response of the plurality of scattering elements is configured to be discretely adjustable.

10. The apparatus of claim 1 wherein the adjustable individual electromagnetic response of the plurality of scattering elements is configured to be continuously adjustable.

11. The apparatus of claim 1 wherein at least one scattering element in the plurality of scattering elements includes a metamaterial element.

12. The apparatus of claim 1 wherein at least one scattering element in the plurality of scattering elements includes a complementary metamaterial element.

13. The apparatus of claim 1 wherein the reflective structure is substantially planar.

14. The apparatus of claim 1 wherein the reflective structure is substantially parabolic.

15. The apparatus of claim 6 wherein the source includes a horn antenna.

16. The apparatus of claim 6 wherein the source is configured to produce a substantially planar wave.

17. The apparatus of claim 6 wherein the source includes a Schwartzchild configuration.

18. The apparatus of claim 1, wherein the incident electromagnetic wave is an incident free-space electromagnetic wave.

19. The apparatus of claim 1 wherein the substrate includes a metallic layer in contact with a non-metallic layer, and wherein the plurality of scattering elements corresponds to a plurality of apertures in the metallic layer.

20. The apparatus of claim 8 wherein the electrically adjustable material includes liquid crystal.

21. An apparatus comprising:

a substrate; and a plurality of scattering elements each having an adjustable individual electromagnetic response to an incident electromagnetic wave in an operating frequency range, the plurality of scattering elements being arranged in a pattern on the substrate, the pattern having an inter-element spacing selected according to the operating frequency range;

wherein the substrate and the plurality of scattering elements form a reflective structure that is responsive to reflect a portion of the incident electromagnetic wave to produce an adjustable radiation field responsive to the adjustable individual electromagnetic responses; and wherein the substrate includes a metallic layer in contact with a non-metallic layer, and wherein the plurality of scattering elements corresponds to a plurality of apertures in the metallic layer.

22. The apparatus of claim 21 wherein the plurality of scattering elements is a plurality of substantially identical scattering elements.

23. The apparatus of claim 21 wherein the operating frequency range has a center frequency and a free-space wavelength corresponding to the center frequency, and wherein the inter-element spacing is less than one-third of the free space wavelength.

24. The apparatus of claim 21 wherein the substrate has a first reflectivity in the operating frequency range and the plurality of scattering elements have a second reflectivity in the operating frequency range, and wherein the first reflectivity is different from the second reflectivity.

25. The apparatus of claim 21 wherein the scattering elements form a one-dimensional array on the substrate structure.

26. The apparatus of claim 21 further comprising a source configured to provide the incident electromagnetic wave.

27. The apparatus of claim 21 further comprising:

control circuitry coupled to the plurality of scattering elements and configured to provide a set of adjustments of the adjustable individual electromagnetic responses.

28. The apparatus of claim 21 wherein each of the scattering elements includes an electrically adjustable material configured to provide the adjustable individual electromagnetic responses.

29. The apparatus of claim 28 wherein the electrically adjustable material includes liquid crystal.

30. The apparatus of claim 21 wherein the adjustable individual electromagnetic response of the plurality of scattering elements is configured to be discretely adjustable.

31. The apparatus of claim 21 wherein the adjustable individual electromagnetic response of the plurality of scattering elements is configured to be continuously adjustable.

32. The apparatus of claim 21 wherein at least one scattering element in the plurality of scattering elements includes a metamaterial element.

33. The apparatus of claim 21 wherein at least one scattering element in the plurality of scattering elements includes a complementary metamaterial element.

34. The apparatus of claim 21 wherein the incident electromagnetic wave is an incident free-space electromagnetic wave.

35. The apparatus of claim 21 wherein the scattering elements form a two-dimensional array on the substrate.

36. An apparatus comprising:

a substrate; and a plurality of scattering elements each having an adjustable individual electromagnetic response to an incident electromagnetic wave in an operating frequency range, the plurality of scattering elements being arranged in a pattern on the substrate, the pattern having an inter-element spacing selected according to the operating frequency range;

wherein the substrate and the plurality of scattering elements form a reflective structure that is responsive to reflect a portion of the incident electromagnetic wave to produce an adjustable radiation field responsive to the adjustable individual electromagnetic responses;

wherein each of the scattering elements includes an electrically adjustable material configured to provide the adjustable individual electromagnetic responses; and wherein the electrically adjustable material includes liquid crystal.

37. The apparatus of claim 36 wherein the plurality of scattering elements is a plurality of substantially identical scattering elements.

38. The apparatus of claim 36 wherein the operating frequency range has a center frequency and a free-space wavelength corresponding to the center frequency, and wherein the inter-element spacing is less than one-third of the free space wavelength.

39. The apparatus of claim 36 wherein the substrate has a first reflectivity in the operating frequency range and the plurality of scattering elements have a second reflectivity in the operating frequency range, and wherein the first reflectivity is different from the second reflectivity.

40. The apparatus of claim 36 wherein the substrate includes a metallic layer in contact with a non-metallic layer, and wherein the plurality of scattering elements corresponds to a plurality of apertures in the metallic layer.

41. The apparatus of claim 36 wherein the scattering elements form a one-dimensional array on the substrate structure.

42. The apparatus of claim 36 further comprising a source configured to provide the incident electromagnetic wave.

43. The apparatus of claim 36 further comprising:

control circuitry coupled to the plurality of scattering elements and configured to provide a set of adjustments of the adjustable individual electromagnetic responses.

44. The apparatus of claim 36 wherein the adjustable individual electromagnetic response of the plurality of scattering elements is configured to be discretely adjustable.

45. The apparatus of claim 36 wherein the adjustable individual electromagnetic response of the plurality of scattering elements is configured to be continuously adjustable.

46. The apparatus of claim 36 wherein at least one scattering element in the plurality of scattering elements includes a metamaterial element.

47. The apparatus of claim 36 wherein at least one scattering element in the plurality of scattering elements includes a complementary metamaterial element.

48. The apparatus of claim 36 wherein the incident electromagnetic wave is an incident free-space electromagnetic wave.

49. The apparatus of claim 36 wherein the scattering elements form a two-dimensional array on the substrate.

50. The apparatus of claim 1 wherein the scattering elements form a two-dimensional array on the substrate.

* * * * *